United States Patent
Li et al.

(10) Patent No.: US 12,197,302 B2
(45) Date of Patent: Jan. 14, 2025

(54) PREDICTION METHOD AND APPARATUS FOR FAULTY GPU, BASED ON PREDICTION MODEL ELECTRONIC DEVICE AND STORAGE MEDIUM

(71) Applicant: Lemon Inc., Grand Cayman (KY)

(72) Inventors: Zhichao Li, Los Angeles, CA (US); Heting Liu, Los Angeles, CA (US); Zherui Liu, Beijing (CN); Chuanxiong Guo, Los Angeles, CA (US); Jian Wang, Beijing (CN)

(73) Assignee: LEMON INC., Grand Cayman (KY)

(*) Notice: Subject to any disclaimer, the term of this patent is extended or adjusted under 35 U.S.C. 154(b) by 0 days.

(21) Appl. No.: 18/542,254

(22) Filed: Dec. 15, 2023

(65) Prior Publication Data

US 2024/0118984 A1  Apr. 11, 2024

Related U.S. Application Data

(63) Continuation of application No. PCT/SG2022/050724, filed on Oct. 11, 2022.

(30) Foreign Application Priority Data

Nov. 25, 2021 (CN) ............ 202111413540.9

(51) Int. Cl.
*G06F 11/22* (2006.01)

(52) U.S. Cl.
CPC ...... *G06F 11/2257* (2013.01); *G06F 11/2236* (2013.01)

(58) Field of Classification Search
CPC .................. G06F 11/2257; G06F 11/2263
See application file for complete search history.

(56) References Cited

U.S. PATENT DOCUMENTS

| | | | |
|---|---|---|---|
| 11,434,843 B1* | 9/2022 | Baramov | F02D 41/0007 |
| 11,899,527 B2* | 2/2024 | Lin | G06F 11/0736 |
| 12,061,465 B2* | 8/2024 | Anand | G05B 19/41885 |
| 2020/0121255 A1* | 4/2020 | Tian | A61B 5/7221 |

(Continued)

FOREIGN PATENT DOCUMENTS

| | | |
|---|---|---|
| CN | 105988918 A | 10/2016 |
| CN | 112766618 A | 5/2021 |
| CN | 112840352 A | 5/2021 |

OTHER PUBLICATIONS

A Sliding-Window Modeling Approach for Neural Network by Xiao Laisheng International Journal of Control and Automation, Aug. 2014 https://article.nadiapub.com/IJCA/vol7_no8/11.pdf (Year: 2014).*

(Continued)

*Primary Examiner* — Joseph O Schell
(74) *Attorney, Agent, or Firm* — Astute IP Law Group (57) ABSTRACT

The present disclosure provides a prediction method and an apparatus for a faulty GPU, an electronic device and a storage medium. The method includes: acquiring parameter information of each GPU in a plurality of GPUs to obtain a parameter information set; inputting the parameter information set into a plurality of pre-trained prediction models to obtain a prediction result corresponding to each prediction model; and determining a faulty GPU from the plurality of GPUs according to the prediction result.

18 Claims, 6 Drawing Sheets

(56) References Cited

U.S. PATENT DOCUMENTS

| | | | |
|---|---|---|---|
| 2020/0305799 A1* | 10/2020 | Cao | A61B 5/7225 |
| 2021/0097438 A1* | 4/2021 | Matsumoto | G06N 7/01 |
| 2021/0263502 A1* | 8/2021 | Queiroz de Macedo | G06F 1/206 |
| 2021/0357282 A1* | 11/2021 | Verma | G06N 3/044 |

OTHER PUBLICATIONS

International Search Report in PCT/SG2022/050724, mailed Jul. 7, 2023, 5 pages.
Frank et al., "Reducing False Node Failure Predictions in HPC", 2019 IEEE 26th International Conference on High Performance Computing, Data, and Analytics(HiPC), Dec. 1, 2019, 10 pages.
Nie et al., "Machine Learning Models for GPU Error Prediction in a Large Scale HPC System", 2018 48th Annual IEEE/IFIP International Conference on Dependable Systems and Networks (DSN), Jun. 28, 2018, 12 pages.

* cited by examiner

PREDICTION METHOD AND APPARATUS FOR FAULTY GPU, BASED ON PREDICTION MODEL ELECTRONIC DEVICE AND STORAGE MEDIUM

CROSS REFERENCE TO RELATED APPLICATIONS

The present application is a continuation of International Patent Application No. PCT/SG2022/050724, filed on Oct. 11, 2022, which claims priority of Chinese Patent Application No. 202111413540.9, filed on Nov. 25, 2021. All the aforementioned patent applications are hereby incorporated by reference in their entireties.

TECHNICAL FIELD

The present disclosure relates to the technical field of computers, and in particular to a prediction method and an apparatus for a faulty GPU, an electronic device and a storage medium.

BACKGROUND

With the rapid popularization of intelligent terminals, Graphic Processing Unit (GPU) is more and more widely used in the field of general computing. GPU with hundreds of computing cores can achieve Tera Floating-Point Operations Per Second (TFLOPS) in computing power. In the field of general computing, the powerful floating-point computing ability of GPU is incomparable to that of Central Processing Unit (CPU), and the general computing power of GPU can make up for the deficiency of the parallel computing power of CPU.

In the related art, in order to understand a state of each GPU in a GPU cluster, a daemon process is deployed on each GPU node, and GPU information such as the model, temperature, power consumption, usage time and usage state of the GPU is collected through the daemon process, then the GPU information is displayed, and an alarm is given when it is determined that the GPU has a fault according to the GPU information.

However, this method gives an alarm only when the GPU is detected to inform the user that the GPU is faulty. After that, the user side will replace the GPU or migrate a program of the faulty GPU to other GPUs for execution, which will affect the normal operation of a business.

SUMMARY

This section is provided to introduce the concepts in a brief form, which will be described in detail in the detailed description later. This part is not intended to identify the key features or essential features of the claimed technical solution, nor is it intended to limit the scope of the claimed technical solution.

According to a first aspect of the present disclosure, a prediction method for a faulty GPU is provided. The method includes: acquiring parameter information of each GPU in a plurality of GPUs to obtain a parameter information set; inputting the parameter information set into a plurality of pre-trained prediction models to obtain a prediction result corresponding to each prediction model; and determining a faulty GPU from the plurality of GPUs according to the prediction result.

According to a second aspect of the present disclosure, a prediction apparatus is provided. The apparatus includes: a parameter information set acquisition module, configured to acquire parameter information of each GPU in a plurality of GPUs to obtain a parameter information set; a prediction result acquisition module, configured to input the parameter information set into a plurality of pre-trained prediction models to obtain a prediction result corresponding to each prediction model; and a prediction module, configured to determine a faulty GPU from the plurality of GPUs according to the prediction result.

According to a third aspect of the present disclosure, a computer-readable medium is provided. The computer-readable medium stores a computer program, and when the computer program is executed by a processing apparatus, steps of the method described in the first aspect are implemented.

According to a fourth aspect of the present disclosure, an electronic device is provided. The electronic device includes: a storage apparatus storing one or more computer programs; and one or more processing apparatus, configured to execute the one or more computer program on the storage apparatus to implement steps of the method in the first aspect.

According to the technical solution provided by the present disclosure, parameter information of each GPU of a plurality of GPUs is acquired to obtain a parameter information set, and then the parameter information set is inputted into a plurality of pre-trained prediction models to obtain a prediction result corresponding to each prediction model, so that prediction results from a plurality of different models for fault rates of the GPUs can be obtained. Finally, the faulty GPU is determined from the plurality of GPUs according to the prediction results, so that the faulty GPU can be predicted more accurately by combining the prediction results of the plurality of prediction models before the GPUs fail, thereby reminding a user to deal with it in time and avoiding affecting the normal operation of services.

Other features and advantages of the present disclosure will be described in detail in the following detailed description.

BRIEF DESCRIPTION OF THE DRAWINGS

The above and other features, advantages, and aspects of embodiments of the present disclosure will become more apparent from the following detailed description when taken in conjunction with the accompanying drawings. Throughout the drawings, the same or similar reference numbers refer to the same or similar elements. It should be understood that the drawings are schematic and that components and elements are not necessarily drawn to scale. In the drawings.

DETAILED DESCRIPTION

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth here, but rather, these embodiments are provided for a more thorough and complete understanding of the present disclosure. It should be understood that the drawings and embodiments of the present disclosure are only used for illustrative purposes, and are not used to limit the protection scope of the present disclosure.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect.

As used herein, the term "including" or "comprising" and its variants are open-ended including, that is, "including but not limited to". The term "based on" is "at least partially based on". The term "a embodiment" means "at least one embodiment"; The term "another embodiment" means "at least one other embodiment". The term "some embodiments" means "at least some embodiments". Related definitions of other terms will be given in the following description.

It should be noted that the concepts of "first" and "second" mentioned in this disclosure are only used to distinguish different devices, modules or units, and are not used to limit the order or interdependence of the functions performed by these devices, modules or units.

It should be noted that the modifications of "a" and "a plurality of" mentioned in this disclosure are schematic rather than limiting, and those skilled in the art should understand that unless the context clearly indicates otherwise, they should be understood as "one or more".

Names of messages or information exchanged among multiple devices in the embodiment of the present disclosure are only used for illustrative purposes, and are not used to limit the scope of these.

In the related technology, in order to predict a fault of a GPU in advance, it is usually to deploy a detection process at nodes of the GPU to extract a state parameter of the GPU from the nodes, then compare the state parameter of the GPU with a preset average state parameter, and finally determine whether the GPU will fail according to a comparison result.

However, this prediction method is too simplistic, and the average state parameter cannot truly reflect a fault standard of the GPU, so that the accuracy of the prediction result cannot be guaranteed.

In view of the above problems, the present disclosure provides a prediction method and an apparatus for a faulty GPU, an electronic device and a storage medium, which can improve the prediction accuracy of the faulty GPU.

The following explains technical terms involved in the present disclosure.

Sliding window: A sliding window algorithm refers to an algorithm which performs a required operation on an array or a string with a given specific window size. This technology can transform a nested loop in some problems into a single loop, and thus can reduce the time complexity.

One-dimensional convolutional neural network (1D-CNN): The input of one-dimensional convolutional neural network is a vector and a convolution kernel, and its output is also a vector. Normally, a length of the input vector is much longer than a length of the convolution kernel.

Multilayer perceptron (MLP) is also called an artificial neural network (ANN) including an input layer and an output layer as well as multiple hidden layers therebetween. The simplest MLP only contains one hidden layer, that is, a three-layer structure. The length of its output vector depends on a padding scheme of a convolution operation and an output of equal width convolution.

A gradient boosting (GB) model refers to a model fitted by using a value of a negative gradient of a loss function in a current model as an approximate value of a residual in a boosting tree algorithm.

Figure 1:
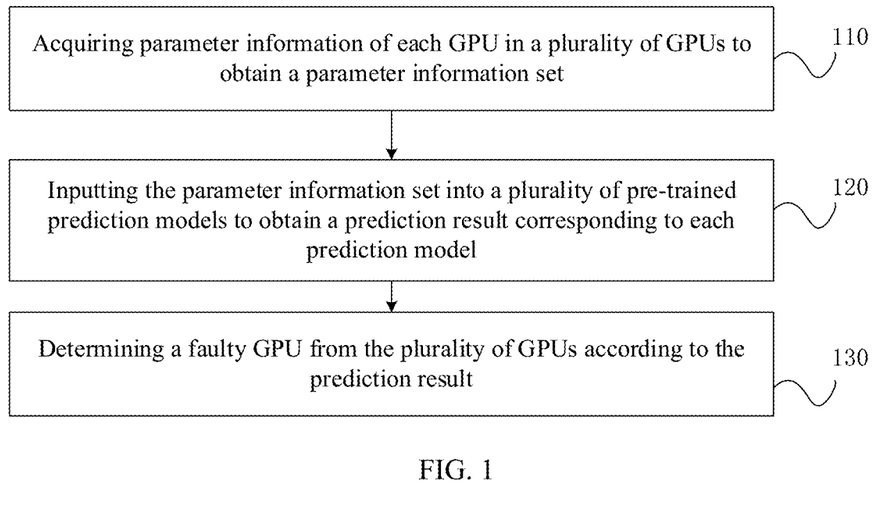
FIG. 1 is a flowchart of a prediction method for a faulty GPU illustrated according to an exemplary embodiment.

FIG. 1 is a flowchart of a prediction method for a faulty GPU illustrated according to an exemplary embodiment. As shown in FIG. 1, the method may include the following steps.

Step 110: acquiring parameter information of each GPU in a plurality of GPUs to obtain a parameter information set.

For example, the prediction method for a faulty GPU provided in this embodiment may be applied to an electronic device, the electronic device may include a terminal device, a server, etc., and the electronic device can establish communication links with a plurality of devices to be tested with GPUs, respectively. The following description takes the electronic device as a server.

In some implementations, the server may receive parameter information of its GPU uploaded by each device to be tested in real time to obtain the parameter information of a plurality of GPUs, and then the parameter information of the plurality of GPUs is integrated into one parameter information set, wherein the server receives the parameter information of the plurality of GPUs in the one parameter information set at the same time. For example, the server takes the parameter information of a plurality of GPUs received from 9:00 to 12:00 as a parameter information set, and the receiving time of the parameter information of each GPU in the parameter information set is from 9:00 to 12:00.

The parameter information of the GPU may characterize a state of the GPU. In some embodiments, the parameter information includes, but is not limited to: temperature, power consumption, GPU utilization rate, GPU memory utilization rate, etc.

Step 120: inputting the parameter information set into a plurality of pre-trained prediction models to obtain a prediction result corresponding to each prediction model.

Illustratively, for example, a server is configured with a plurality of pre-trained prediction models. For example, the prediction models include a first prediction model and a second prediction model. The server may input the parameter information set into the first prediction model and the second prediction model respectively, and then acquire a first prediction result outputted by the first prediction model according to the parameter information set and a second prediction result outputted by the second prediction model according to the parameter information set; wherein, the prediction result includes a fault rate corresponding to each GPU in the parameter information set.

Step 130: determining a faulty GPU from the plurality of GPUs according to the prediction result.

Following the above example, the server may screen out a first faulty GPU that meet a preset condition according to the first prediction result, for example, the GPU with a fault rate in the first prediction result being greater than a first probability threshold (such as 80%) is selected as the first faulty GPU. Then, a second faulty GPU that meet a second preset condition is selected according to the second prediction result, for example, the GPU with a fault rate in the second prediction result being greater than a second probability threshold (such as 90%) is selected as the second faulty GPU, and finally, the same GPU among the first faulty GPU and the second faulty GPU is selected as the faulty GPU. The first probability threshold and the second probability threshold may be the same or different, which are not limited here.

It can be seen that in this embodiment, parameter information of each GPU of a plurality of GPUs is acquired to obtain a parameter information set, and then the parameter information set is inputted into a plurality of pre-trained prediction models to obtain a prediction result corresponding to each prediction model, so that prediction results from a plurality of different models for fault rates of the GPUs can be obtained. Finally, the faulty GPU is determined from the plurality of GPUs according to the prediction results, so that the faulty GPU can be predicted by combining the prediction results of the plurality of prediction models before the GPUs fail, thereby reminding a user to deal with it in time and avoiding affecting the normal operation of services. Since the prediction results of different prediction models are considered in determining the faulty GPU, the factors considered are more comprehensive and the prediction is more accurate.

Figure 2:
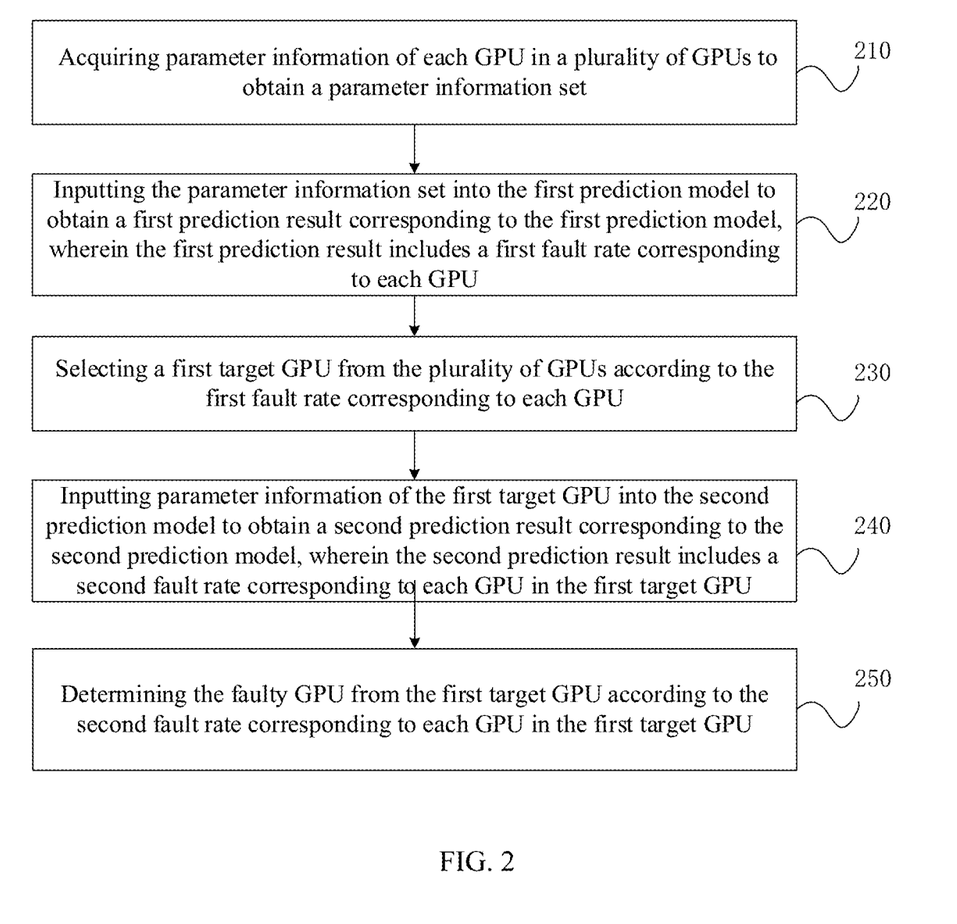
FIG. 2 is a flowchart of a prediction method for a faulty GPU illustrated according to another exemplary embodiment.

FIG. 2 is a flowchart of a prediction method for a faulty GPU illustrated according to another exemplary embodiment. As shown in FIG. 2, the method may include the following steps.

Step 210: acquiring parameter information of each GPU in a plurality of GPUs to obtain a parameter information set.

The specific implementation of step 210 may refer to step 110, so it is not repeated here.

Step 220: inputting the parameter information set into the first prediction model to obtain a first prediction result corresponding to the first prediction model, wherein the first prediction result includes a first fault rate corresponding to each GPU.

Illustratively, for example, the parameter information set includes parameter information 1 corresponding to GPU1, parameter information 2 corresponding to GPU2, parameter information 3 corresponding to GPU3, . . . , and parameter information 10 corresponding to GPU10. The server may input parameter information 1 to parameter information 10 into the first prediction model to obtain a first fault rate a1 of GPU1, a first fault rate a2 of GPU2, . . . , a first fault rate a10 of GPU10, that are outputted by the first prediction model.

Step 230: selecting a first target GPU from the plurality of GPUs according to the first fault rate corresponding to each GPU.

In some implementations, the specific implementation of step 230 may include:
determining top m GPUs with higher first fault rates in the first prediction result as the first target GPU.

Illustratively, the server may sort the first fault rate a1, the first fault rate a2, the first fault rate a3, . . . , the first fault rate a10 in descending order, and then select and determine GPUs with top m first fault rates from the ordered GPUs as first target GPUs. For example, m=3, and the top three fault rates are the first fault rate a2, the first fault rate a4 and the first fault rate a6, then the first target GPUs include GPU2, GPU4 and GPU6; and wherein m is a positive integer and may be determined according to a total number of GPUs, for example, m may be equal to a total number of GPUs multiplied by k1%.

In other embodiments, the specific implementation of step 230 may include:
determining a GPU with a first fault rate being greater than or equal to a first fault rate threshold in the first prediction result as the first target GPU. In some embodiments, the first fault rate threshold may be a user-defined setting or an average value of all the first fault rates.

Step 240: inputting parameter information of the first target GPU into the second prediction model to obtain a second prediction result corresponding to the second prediction model, wherein the second prediction result includes a second fault rate corresponding to each GPU in the first target GPU.

Illustratively, the server may input parameter information a2 of GPU2, parameter information a4 of GPU4 and parameter information a6 of GPU6 into the second prediction model to obtain a second fault rate b2 corresponding to GPU2, a second fault rate b4 corresponding to GPU4 and a second fault rate b6 corresponding to GPU6, that are outputted by the second prediction model.

Step 250: determining the faulty GPU from the first target GPU according to the second fault rate corresponding to each GPU in the first target GPU.

In some implementations, the specific implementation of step 250 includes:
determining top n first target GPUs with higher second fault rates in the second prediction result as the faulty GPU.

Illustratively, the server may sort the second fault rate b2, the second fault rate b4 and the second fault rate b6 in descending order, and then select and determine GPUs with top n second fault rates from the ordered GPUs as faulty GPUs. For example, n=1, and the second fault rate b4 ranks first, then the server may determine the GPU4 corresponding to the second fault rate b4 as the faulty GPU.

Among them, n is a positive integer and may be determined according to a total number of GPUs, for example, n may be equal to a total number of GPUs multiplied by k2%, and k1 and k2 may be the same or different, which are not limited here.

In other embodiments, the specific implementation of step 250 may include:
determining a first target GPU with a second fault rate being greater than or equal to a second fault rate threshold in the second prediction result as the faulty GPU. In some embodiments, the second fault rate threshold may be a user-defined setting or an average value of all the second fault rates.

In some embodiments, the first prediction model is a 1D-CNN model and the second prediction model is an MLP model; or, the first prediction model is an MLP model and the second prediction model is a 1D-CNN model. The first prediction model and the second prediction model are both trained according to a plurality of parameter information samples of the GPUs, and can output the fault rate of each GPU according to the input parameter information of the GPU.

Figure 3:
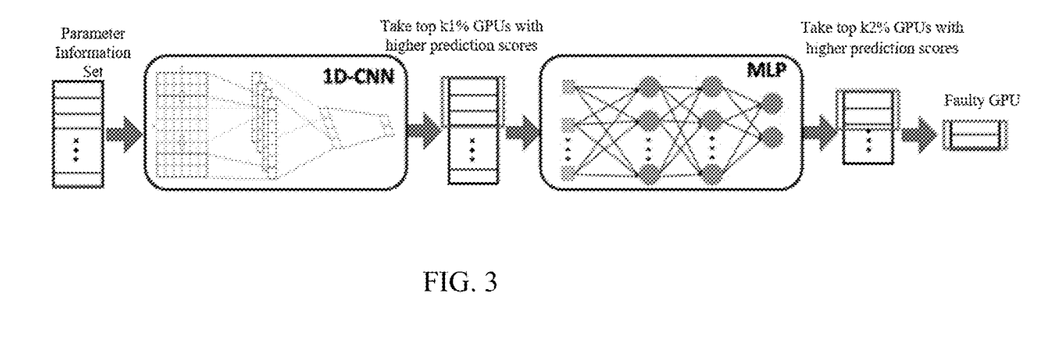
FIG. 3 is a schematic diagram of implementing a prediction method for a faulty GPU based on a cascading architecture model illustrated according to an embodiment of FIG. 2.

Illustratively, in practical application, as shown in FIG. 3, the 1D-CNN model and the MLP model may form a cascading architecture model. The server may first input the parameter information set into the 1D-CNN model and take top k1% GPUs with the higher prediction scores predicted by the 1D-CNN model as first target GPUs, and then input the parameter information of the first target GPUs into the MLP model for prediction and take the top k2% GPUs with the higher prediction scores predicted by the MLP model as the faulty GPUs; wherein, the prediction score may be positively correlated with the fault rate.

In some implementations, the number of cascaded models in a cascading architecture may not be limited, and a cascading order of different models may not be limited. For example, a third prediction model may further be cascaded on the basis of the first prediction model and the second prediction model. The second prediction model may obtain second target GPUs according to the above method, then input the parameter information of the second target GPUs into the third prediction model, and then take top k3% GPUs with the higher prediction scores outputted by the third prediction model as faulty GPUs. By analogy, a plurality of identical or different models can be cascaded in this way to predict the faulty GPUs.

It can be understood that in this embodiment, the training of the prediction model can be end-to-end training, that is, a plurality of models are cascaded to be trained.

In this implementation, by using a GPU fault timing model proposed based on a cascading technology, the prediction precision is improved by 11.1% on average through experimental data verification, so that the prediction accuracy is effectively improved.

Figure 4:
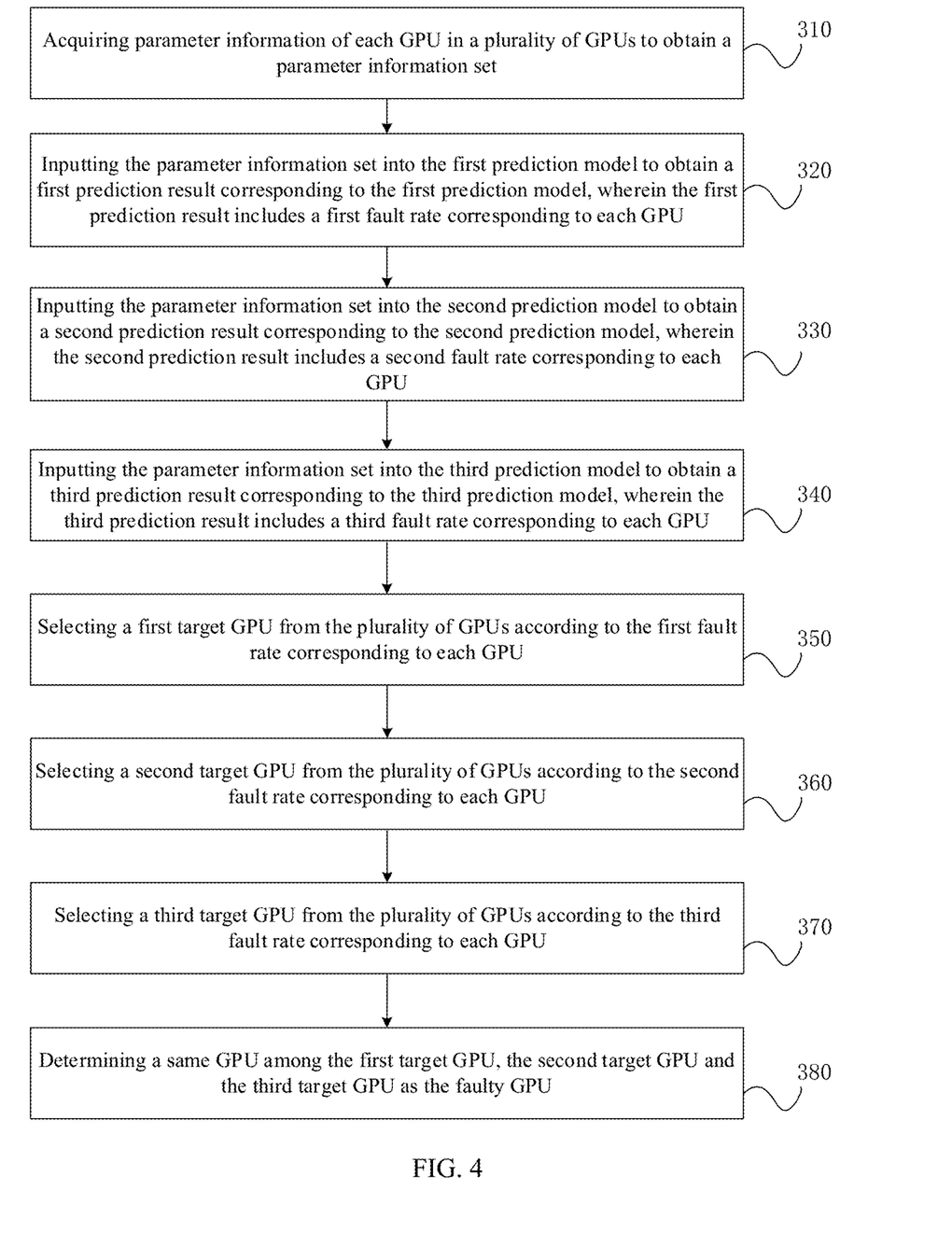
FIG. 4 is a flowchart of a prediction method for a faulty GPU illustrated according to yet another exemplary embodiment.

FIG. 4 is a flowchart of a prediction method for a faulty GPU illustrated according to yet another exemplary embodiment. As shown in FIG. 4, the method may include the following steps.

Step 310: acquiring parameter information of each GPU in a plurality of GPUs to obtain a parameter information set.

The specific implementation of step 310 may refer to step 110, so it is not repeated here.

In some implementations, the specific implementation of step 310 may include: acquiring parameter information of each GPU in a plurality of GPUs according to a preset cycle to obtain a parameter information set, wherein a cycle duration of the preset cycle is greater than or equal to a specified duration.

Illustratively, when the specified duration is one day and the preset cycle may be predicting once every three days, the pre-trained prediction model will acquire the parameter information of each GPU in a plurality of GPUs for three days at a time to obtain a parameter information set, and then make prediction based on the parameter information set.

Considering that the prediction model can determine the faulty GPU according to the parameter information set acquired in one day, then it can definitely determine the faulty GPU according to the parameter information set acquired in three days. After all, the GPU that fails in one day will definitely fails in three days. In this implementation, by setting the cycle duration of the preset cycle greater than or equal to the specified duration, the prediction time duration can be effectively increased, and the precision of the prediction model can be improved by 4.1% on average through experimental data verification, so that the prediction accuracy of the prediction model is effectively improved.

In some implementations, before step 310, the method may further include: acquiring a parameter information sample of a GPU; performing sliding-sampling on the parameter information sample through a preset sliding window to obtain a first sample; and then performing model training based on the first sample to obtain a plurality of prediction models.

Illustratively, the server may take the parameter information of a plurality of GPUs collected in history as parameter information samples to obtain a plurality of parameter information samples, then arrange the plurality of parameter information samples in a specified way, and then perform sliding-sampling on the parameter information samples through a preset sliding window, for example, when a window size of the sliding window is a preset size (such as three) and a sliding direction of the sliding window is a preset direction (such as from left to right), every three parameter information samples may be sampled once to obtain a first sample, and then the first sample is inputted into different specified models (such as the 1D-CNN model, the MLP model, etc.) for training to obtain a plurality of prediction models.

In some embodiments, the specified way can be random arrangement or chronological arrangement, which is not limited here.

In this implementation, by performing sliding-sampling on the training samples through the preset sliding window, the number of normal samples can be increased to about 60 times, so that the prediction accuracy of the trained prediction model is improved.

Step 320: inputting the parameter information set into the first prediction model to obtain a first prediction result corresponding to the first prediction model, wherein the first prediction result includes a first fault rate corresponding to each GPU.

Illustratively, for example, the parameter information set includes parameter information 1 corresponding to GPU1, parameter information 2 corresponding to GPU2, parameter information 3 corresponding to GPU3, . . . , and parameter information 10 corresponding to GPU10. The server may input parameter information 1 to parameter information 10 into the first prediction model to obtain a first fault rate a1 of GPU1, a first fault rate a2 of GPU2, . . . , a first fault rate a10 of GPU10, that are outputted by the first prediction model.

Step 330: inputting the parameter information set into the second prediction model to obtain a second prediction result corresponding to the second prediction model, wherein the second prediction result includes a second fault rate corresponding to each GPU.

Following the above example, the server may also input parameter information 1 to parameter information 10 into the second prediction model to obtain a second fault rate b1 of GPU1, a second fault rate b2 of GPU2, . . . , a second fault rate b10 of GPU10, that are outputted by the second prediction model.

Step 340: inputting the parameter information set into the third prediction model to obtain a third prediction result corresponding to the third prediction model, wherein the third prediction result includes a third fault rate corresponding to each GPU.

Following the above example, the server may also input parameter information 1 to parameter information 10 into the third prediction model to obtain a third fault rate c1 of GPU1, a third fault rate c2 of GPU2, . . . , a third fault rate c10 of the GPU10, that are outputted by the third prediction model.

Step 350: selecting a first target GPU from the plurality of GPUs according to the first fault rate corresponding to each GPU.

In some implementations, the top m GPUs with higher first fault rates in the first prediction result are determined as first target GPUs.

Illustratively, for example, m=4, and in the first prediction result, the first fault rates are sorted as a2, a3, a4, a10 . . . in descending order, then it can be determined that the first target GPUs are GPU2, GPU3, GPU4 and GPU10.

Step 360: selecting a second target GPU from the plurality of GPUs according to the second fault rate corresponding to each GPU.

In some implementations, the top n GPUs with higher second fault rates in the second prediction result are determined as second target GPUs.

Illustratively, for example, n=4, in the second prediction result, the second fault rates are sorted as b1, b3, b2, b7 . . . in descending order, then it can be determined that the second target GPUs are GPU1, GPU3, GPU2 and GPU7.

Step 370: selecting a third target GPU from the plurality of GPUs according to the third fault rate corresponding to each GPU.

In some implementations, the top k GPUs with higher third fault rates in the third prediction result are determined as third target GPUs.

Illustratively, for example, k=3, and in the third prediction result, the third fault rates are sorted as c3, c5, c6, c9 . . . in descending order, then it can be determined that the third target GPUs are GPU3, GPU5, GPU6 and GPU9.

Step 380: determining a same GPU among the first target GPU, the second target GPU and the third target GPU as the faulty GPU.

Following the above example, GPU3 may be determined as the faulty GPU.

Among them, m, n and k are all positive integers, and m, n and k may be the same or different, which are not limited here. In some embodiments, m, n, and k may be determined according to a total number of GPUs, which may be specifically k % of the total number of GPUs.

In some embodiments, the first prediction model is a 1D-CNN model, the second prediction model is an MLP model, and the third prediction model is a GB model.

Figure 5:
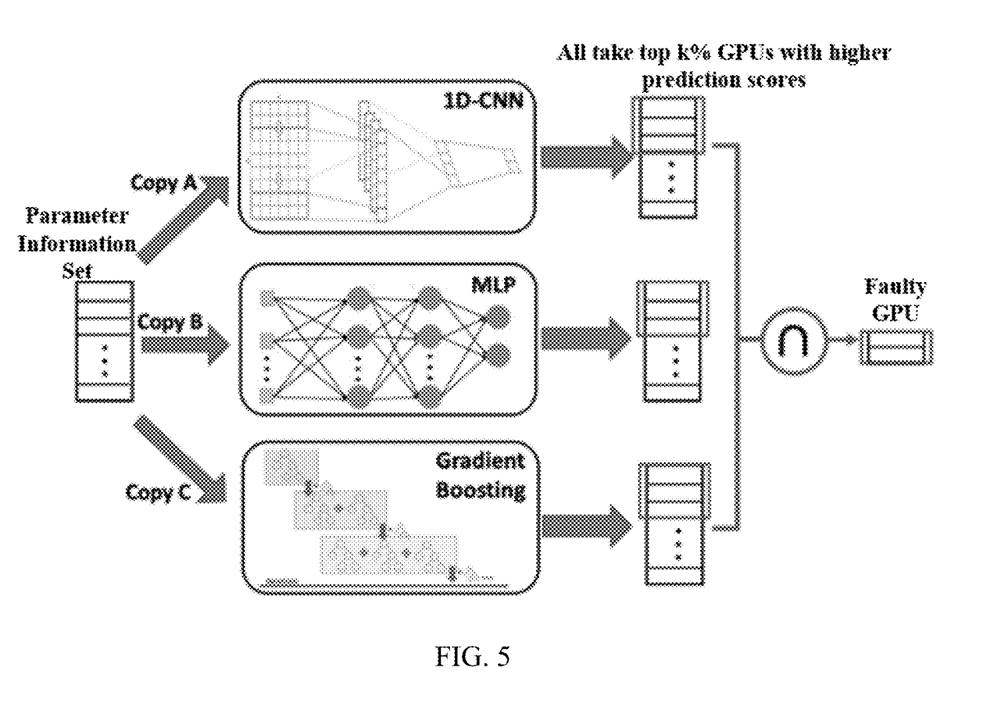
FIG. 5 is a schematic diagram of implementing a prediction method for a faulty GPU based on a cascading architecture model illustrated according to an embodiment of FIG. 4.

Illustratively, in practical application, as shown in FIG. 5, the 1D-CNN model, the MLP model and the GB model may form a parallel architecture model, and the server may input the parameter information set into the 1D-CNN model, MLP model and GB model respectively, and then take an intersection of GPUs with prediction scores being top k1% predicted by the 1D-CNN model, the MLP model and the GB model as faulty GPUs. The prediction score of a GPU may be positively correlated with the fault rate of the GPU.

In some implementations, the parallel architecture model may include at least two prediction models, and the specific number is not limited here. For example, the parallel architecture model may also include four or more prediction models, and a plurality of prediction models are different prediction models, so that the faulty GPU can be determined by combining decisions of various models.

In this embodiment, by using the parallel architecture model proposed to predict the faulty GPU, the precision can be improved by 13% on average through experimental data verification, so that the prediction accuracy is effectively improved.

It can be understood that in this embodiment, the parallel architecture model can be obtained by training each prediction model separately based on the first sample.

In some implementations, the method further includes: in a case where a service time of a currently used prediction model is longer than a preset duration, acquiring a new parameter information sample of the GPU, and performing sliding-sampling on the new parameter information sample through the preset sliding window to obtain a second sample; and performing model training based on the second sample to obtain the plurality of prediction models.

Illustratively, when the preset duration is 15 days, the server may re-acquire new parameter information samples of the GPUs every 15 days, and perform sliding-sampling on the new parameter information samples through the preset sliding window to obtain the second sample, and then retrain the model based on the second sample to obtain a plurality of new prediction models, so that the plurality of prediction models are streaming models instead of fixed static models.

In this implementation, by using the streaming model technology, compared with the fixed model, the precision can be improved by 24.7% on average through experimental data verification, so that the prediction accuracy of the prediction model is improved.

Figure 6:
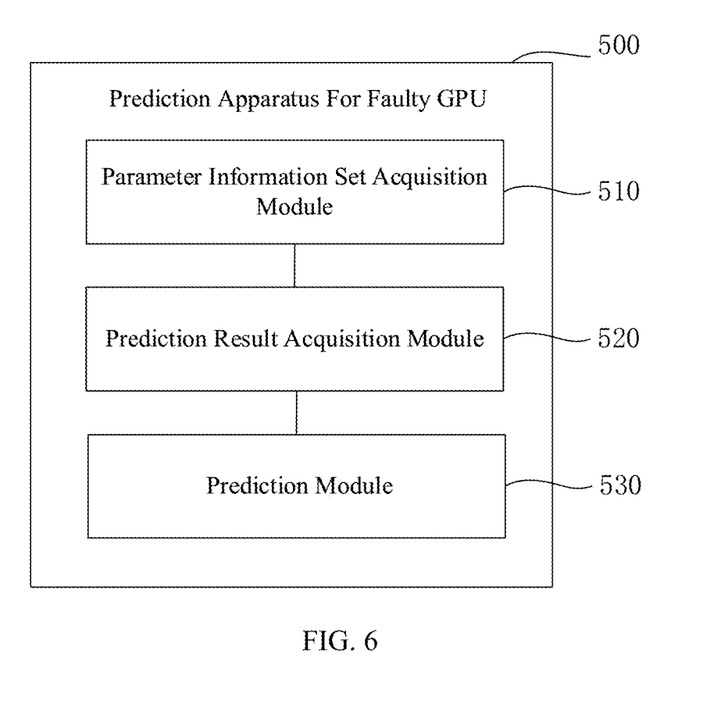
FIG. 6 is a block diagram of a predicting apparatus for a faulty GPU illustrated according to an exemplary embodiment.

FIG. 6 is a block diagram of a prediction apparatus for a faulty GPU illustrated according to an exemplary embodiment. As shown in FIG. 6, the apparatus 500 may include: a parameter information set acquisition module 510, a prediction result acquisition module 520, and a prediction module 530.

The parameter information set acquisition module 510 is configured to acquire parameter information of each GPU in a plurality of GPUs to obtain a parameter information set.

The prediction result acquisition module 520 is configured to input the parameter information set into a plurality of pre-trained prediction models to obtain a prediction result corresponding to each prediction model.

The prediction module 530 is configured to determine a faulty GPU from the plurality of GPUs according to the prediction result.

In some implementations, the plurality of prediction models include a first prediction model and a second prediction model, and the prediction result acquisition module 520 includes:
  a first prediction result determination sub-module, configured to input the parameter information set into the first prediction model to obtain a first prediction result corresponding to the first prediction model, wherein the first prediction result includes a first fault rate corresponding to each GPU;
  a first target GPU determination sub-module, configured to select a first target GPU from the plurality of GPUs according to the first fault rate corresponding to each GPU; and
  a second prediction result determination sub-module, configured to input parameter information of the first target GPU into the second prediction model to obtain a second prediction result corresponding to the second prediction model, wherein the second prediction result includes a second fault rate corresponding to each GPU in the first target GPU.

Accordingly, the prediction module 530 includes:
  a faulty GPU determination sub-module, configured to determine the faulty GPU from the first target GPU according to the second fault rate corresponding to each GPU in the first target GPU.

In some implementations, the first target GPU determination sub-module is further configured to determine top m GPUs with higher first fault rates in the first prediction result as the first target GPU, wherein m is a positive integer.

The faulty GPU determination sub-module is further configured to determine top n first target GPUs with higher second fault rates in the second prediction result as the faulty GPU, wherein n is a positive integer.

In some implementations, the first prediction model is a 1D-CNN model and the second prediction model is an MLP model; or, the first prediction model is an MLP model and the second prediction model is a 1D-CNN model.

In some implementations, the prediction model includes a first prediction model, a second prediction model and a third prediction model, and the prediction result acquisition module 520 is specifically configured to:
- input the parameter information set into the first prediction model to obtain a first prediction result corresponding to the first prediction model, wherein the first prediction result includes a first fault rate corresponding to each GPU;
- input the parameter information set into the second prediction model to obtain a second prediction result corresponding to the second prediction model, wherein the second prediction result includes a second fault rate corresponding to each GPU; and
- input the parameter information set into the third prediction model to obtain a third prediction result corresponding to the third prediction model, wherein the third prediction result includes a third fault rate corresponding to each GPU.

Accordingly, the prediction module 530 is specifically configured to: select a first target GPU from the plurality of GPUs according to the first fault rate corresponding to each GPU; select a second target GPU from the plurality of GPUs according to the second fault rate corresponding to each GPU; select a third target GPU from the plurality of GPUs according to the third fault rate corresponding to each GPU; and determine a same GPU among the first target GPU, the second target GPU and the third target GPU as the faulty GPU.

In some implementations, the prediction result acquisition module 520 is further specifically configured to: determine top m GPUs with higher first fault rates in the first prediction result as the first target GPU; determine top n GPUs with higher second fault rates in the second prediction result as the second target GPU; and determine top k GPUs with higher third fault rates in the third prediction result as the third target GPU, wherein m, n and k are positive integers.

In some implementations, the first prediction model is a 1D-CNN model, the second prediction model is an MLP model, and the third prediction model is a GB model.

In some implementations, the parameter information set acquisition module 510 is specifically configured to acquire the parameter information of each GPU in the plurality of GPUs according to a preset cycle to obtain the parameter information set, wherein a cycle duration of the preset cycle is greater than or equal to a specified duration.

In some implementations, the apparatus 500 further includes:
- a sample acquisition module, configured to acquire a parameter information sample of a GPU;
- a preprocessing module, configured to perform sliding-sampling on the parameter information sample through a preset sliding window to obtain a first sample; and
- a first model training module, configured to perform model training based on the first sample to obtain a plurality of prediction models.

In some implementations, the apparatus 500 further includes:
- a second sample acquisition module, configured to: in a case where a service time of a currently used prediction model is longer than a preset duration, acquiring a new parameter information sample of the GPU, and performing sliding-sampling on the new parameter information sample through the preset sliding window to obtain a second sample; and
- a second model training module, configured to perform model training based on the second sample to obtain the plurality of prediction models.

Figure 7:
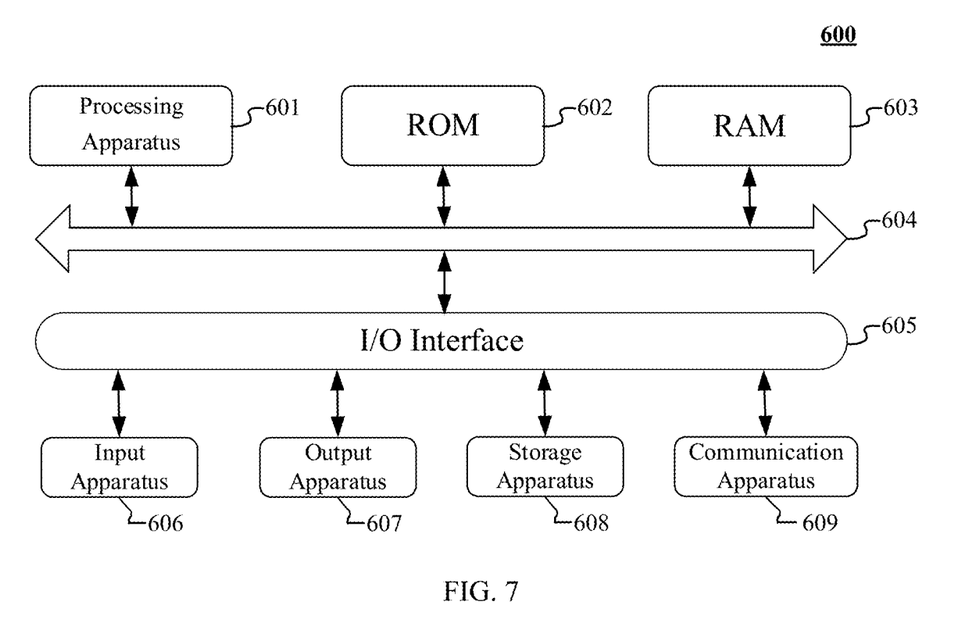
FIG. 7 is a schematic structural diagram of an electronic device illustrated according to an exemplary embodiment.

Referring to FIG. 7, FIG. 7 illustrates a schematic structural diagram of an electronic device 600 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal) or the like, and fixed terminals such as a digital TV, a desktop computer, or the like. The electronic device illustrated in FIG. 7 is merely an example, and should not pose any limitation to the functions and the range of use of the embodiments of the present disclosure.

As illustrated in FIG. 7, the electronic device 600 may include a processing apparatus 601 (e.g., a central processing unit, a graphics processing unit, etc.), which can perform various suitable actions and processing according to a program stored in a read-only memory (ROM) 602 or a program loaded from a storage apparatus 608 into a random-access memory (RAM) 603. The RAM 603 further stores various programs and data required for operations of the electronic device 600. The processing apparatus 601, the ROM 602, and the RAM 603 are interconnected by means of a bus 604. An input/output (I/O) interface 605 is also connected to the bus 604.

Usually, the following apparatus may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a magnetic tape, a hard disk, or the like; and a communication apparatus 609. The communication apparatus 609 may allow the electronic device 600 to be in wireless or wired communication with other devices to exchange data. While FIG. 7 illustrates the electronic device 600 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 609 and installed, or may be installed from the storage apparatus 608, or may be installed from the ROM 602. When the computer program is executed by the processing apparatus 601, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the electronic device may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: acquire parameter information of each GPU in a plurality of GPUs to obtain a parameter information set; input the parameter information set into a plurality of pre-trained prediction models to obtain a prediction result corresponding to each prediction model; and determine a faulty GPU from the plurality of GPUs according to the prediction result.

Alternatively, the above-mentioned computer-readable medium carries one or more programs, and when the one or more programs are executed by the electronic device, the electronic device is caused to: acquire parameter information of each GPU in a plurality of GPUs to obtain a parameter information set; input the parameter information set into a plurality of pre-trained prediction models to obtain a prediction result corresponding to each prediction model; and determine a faulty GPU from the plurality of GPUs according to the prediction result.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. A prediction method for a faulty GPU, comprising:
   acquiring parameter information of each GPU in a plurality of GPUs to obtain a parameter information set;
   inputting the parameter information set into a plurality of pre-trained prediction models to obtain a prediction result corresponding to each prediction model; and
   determining a faulty GPU from the plurality of GPUs according to the prediction result,
   wherein the plurality of prediction models comprise a first prediction model and a second prediction model,
   inputting the parameter information set into the plurality of pre-trained prediction models to obtain the prediction result corresponding to each prediction model comprises:
   inputting the parameter information set into the first prediction model to obtain a first prediction result corresponding to the first prediction model, wherein the first prediction result comprises a first fault rate corresponding to each GPU;
   selecting one or more first target GPUs from the plurality of GPUs according to the first fault rate corresponding to each GPU; and
   inputting parameter information of the one or more first target GPUs into the second prediction model to obtain a second prediction result corresponding to the second prediction model, wherein the second prediction result comprises a second fault rate corresponding to each GPU in the one or more first target GPUs; and
   determining the faulty GPU from the plurality of GPUs according to the prediction results comprises:
   determining the faulty GPU from the one or more first target GPUs according to the second fault rate corresponding to each GPU in the one or more first target GPUs.

2. The method according to claim 1, wherein
   selecting the one or more first target GPUs from the plurality of GPUs according to the first fault rate corresponding to each GPU comprises:
   determining top m GPUs with higher first fault rates in the first prediction result as the one or more first target GPUs, wherein m is a positive integer; and
   determining the faulty GPU from the one or more first target GPUs according to the second fault rate corresponding to each GPU in the one or more first target GPUs comprises:
   determining top n first target GPUs with higher second fault rates in the second prediction result as the faulty GPU, wherein n is a positive integer.

3. The method according to claim 1, wherein the first prediction model is a 1D-CNN model and the second prediction model is an MLP model;
   or, the first prediction model is an MLP model and the second prediction model is a 1D-CNN model.

4. The method according to claim 1, wherein acquiring the parameter information of each GPU in the plurality of GPUs to obtain the parameter information set comprises:
   acquiring the parameter information of each GPU in the plurality of GPUs according to a preset cycle to obtain the parameter information set, wherein a cycle duration of the preset cycle is greater than or equal to a specified duration.

5. The method according to claim 1, wherein before acquiring the parameter information of each GPU in the plurality of GPUs to obtain the parameter information set, the method further comprises:
   acquiring a parameter information sample of a GPU;
   performing sliding-sampling on the parameter information sample through a preset sliding window to obtain a first sample; and
   performing model training based on the first sample to obtain a plurality of prediction models.

6. The method according to claim 5, further comprising:
   in a case where a service time of a currently used prediction model is longer than a preset duration, acquiring a new parameter information sample of the GPU, and performing sliding-sampling on the new parameter information sample through the preset sliding window to obtain a second sample; and
   performing model training based on the second sample to obtain the plurality of prediction models.

7. A non-transitory computer-readable medium, comprising a computer program, wherein, when the computer program is executed by a processing apparatus, steps of the method according to claim 1 are implemented.

8. An electronic device, comprising:
   a storage apparatus storing one or more computer programs; and one or more processing apparatuses, configured to execute the one or more computer programs on the storage apparatus to implement steps of the method according to claim 1.

9. The electronic device according to claim 8, wherein acquiring the parameter information of each GPU in the plurality of GPUs to obtain the parameter information set comprises:
acquiring the parameter information of each GPU in the plurality of GPUs according to a preset cycle to obtain the parameter information set, wherein a cycle duration of the preset cycle is greater than or equal to a specified duration.

10. The electronic device according to claim 8, wherein selecting the one or more first target GPUs from the plurality of GPUs according to the first fault rate corresponding to each GPU comprises:
determining top m GPUs with higher first fault rates in the first prediction result as the one or more first target GPUs, wherein m is a positive integer; and
determining the faulty GPU from the one or more first target GPUs according to the second fault rate corresponding to each GPU in the one or more first target GPUs comprises:
determining top n first target GPUs with higher second fault rates in the second prediction result as the faulty GPU, wherein n is a positive integer.

11. The electronic device according to claim 8, wherein the first prediction model is a 1D-CNN model and the second prediction model is an MLP model;
or, the first prediction model is an MLP model and the second prediction model is a 1D-CNN model.

12. A prediction method for a faulty GPU, comprising:
acquiring parameter information of each GPU in a plurality of GPUs to obtain a parameter information set;
inputting the parameter information set into a plurality of pre-trained prediction models to obtain a prediction result corresponding to each prediction model; and
determining a faulty GPU from the plurality of GPUs according to the prediction result,
wherein the prediction models comprise a first prediction model, a second prediction model and a third prediction model,
inputting the parameter information set into the plurality of pre-trained prediction models to obtain the prediction result corresponding to each prediction model comprises:
inputting the parameter information set into the first prediction model to obtain a first prediction result corresponding to the first prediction model, wherein the first prediction result comprises a first fault rate corresponding to each GPU;
inputting the parameter information set into the second prediction model to obtain a second prediction result corresponding to the second prediction model, wherein the second prediction result comprises a second fault rate corresponding to each GPU; and
inputting the parameter information set into the third prediction model to obtain a third prediction result corresponding to the third prediction model, wherein the third prediction result comprises a third fault rate corresponding to each GPU; and
determining the faulty GPU from the plurality of GPUs according to the prediction result comprises:
selecting one or more first target GPUs from the plurality of GPUs according to the first fault rate corresponding to each GPU;
selecting a second target GPU from the plurality of GPUs according to the second fault rate corresponding to each GPU;
selecting a third target GPU from the plurality of GPUs according to the third fault rate corresponding to each GPU; and
determining a same GPU among the one or more first target GPUs, the second target GPU and the third target GPU as the faulty GPU.

13. The method according to claim 12, wherein
selecting the one or more first target GPUs from the plurality of GPUs according to the first fault rate corresponding to each GPU comprises:
determining top m GPUs with higher first fault rates in the first prediction result as the one or more first target GPUs, wherein m is a positive integer;
selecting the second target GPU from the plurality of GPUs according to the second fault rate corresponding to each GPU comprises:
determining top n GPUs with higher second fault rates in the second prediction result as the second target GPU, wherein n is a positive integer; and
selecting the third target GPU from the plurality of GPUs according to the third fault rate corresponding to each GPU comprises:
determining top k GPUs with higher third fault rates in the third prediction result as the third target GPU, wherein k is a positive integer.

14. The method according to claim 12, wherein the first prediction model is a 1D-CNN model, the second prediction model is an MLP model, and the third prediction model is a GB model.

15. An electronic device, comprising:
a storage apparatus storing one or more computer programs; and
one or more processing apparatuses, configured to execute the one or more computer programs on the storage apparatus to implement steps of the method according to claim 12.

16. The electronic device according to claim 15, wherein
selecting the one or more first target GPUs from the plurality of GPUs according to the first fault rate corresponding to each GPU comprises:
determining top m GPUs with higher first fault rates in the first prediction result as the one or more first target GPUs, wherein m is a positive integer;
selecting the second target GPU from the plurality of GPUs according to the second fault rate corresponding to each GPU comprises:
determining top n GPUs with higher second fault rates in the second prediction result as the second target GPU, wherein n is a positive integer; and
selecting the third target GPU from the plurality of GPUs according to the third fault rate corresponding to each GPU comprises:
determining top k GPUs with higher third fault rates in the third prediction result as the third target GPU, wherein k is a positive integer.

17. The electronic device according to claim 15, wherein the first prediction model is a 1D-CNN model, the second prediction model is an MLP model, and the third prediction model is a GB model.

18. A non-transitory computer-readable medium, comprising a computer program, wherein, when the computer program is executed by a processing apparatus, steps of the method according to claim 12 are implemented.

\* \* \* \* \*